July 23, 1940.  H. SEBELL  2,209,286
ELECTRIC WELDING MACHINE
Filed Oct. 10, 1936  3 Sheets-Sheet 1

Inventor.
Harry Sebell
Cushman Darby & Cushman
Attys.

July 23, 1940.                H. SEBELL                 2,209,286
                         ELECTRIC WELDING MACHINE
                        Filed Oct. 10, 1936       3 Sheets-Sheet 2

Inventor.
Harry Sebell
Cushman Darby & Cushman
Attys.

July 23, 1940.  H. SEBELL  2,209,286
ELECTRIC WELDING MACHINE
Filed Oct. 10, 1936  3 Sheets-Sheet 3
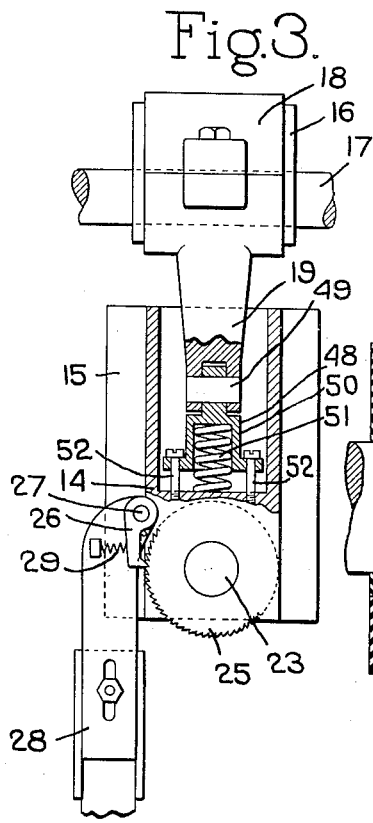
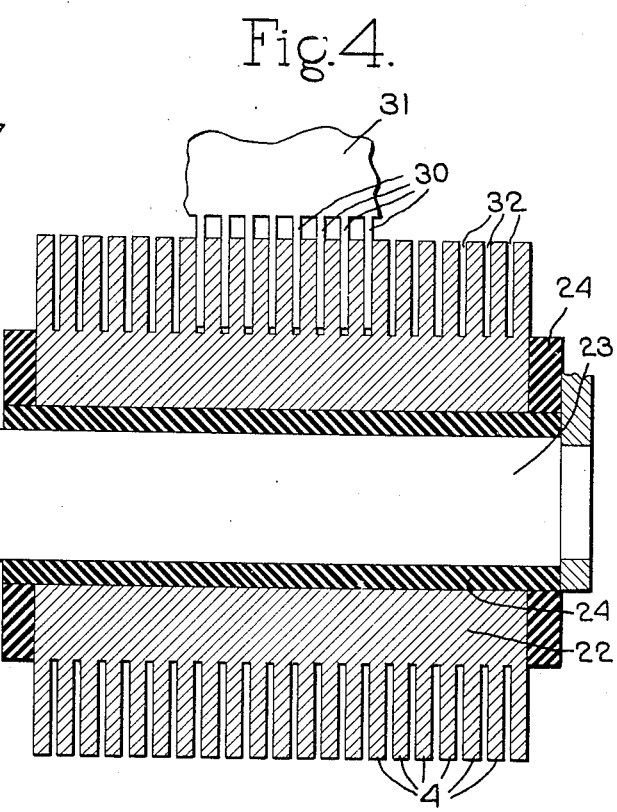
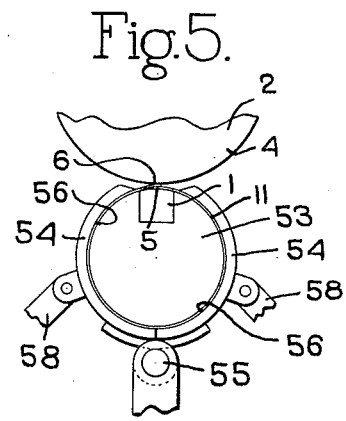
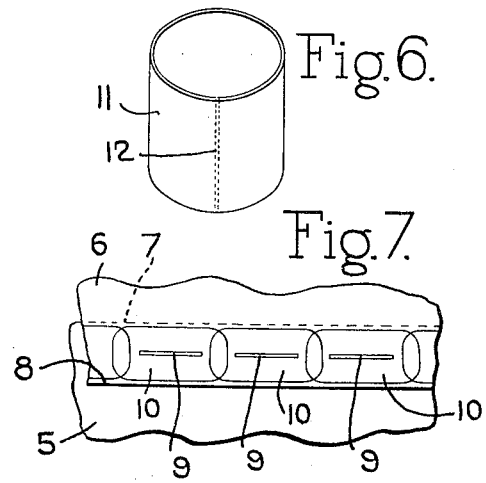
Inventor.
Harry Sebell
Cushman Darby & Cushman
Attys.

Patented July 23, 1940

2,209,286

UNITED STATES PATENT OFFICE 2,209,286

ELECTRIC WELDING MACHINE

Harry Sebell, Boston, Mass., assignor, by mesne assignments, to Crown Can Company, Philadelphia, Pa., a corporation of Pennsylvania Application October 10, 1936, Serial No. 105,119

5 Claims. (Cl. 219—4)

This invention relates to electric welding machines and particularly to a welding machine designed for welding the side seam of a can body.

One of the objects of the invention is to provide a novel electric welding machine by which a continuous welded seam of any desired length can be made at one operation by the spot welding method. As applied to welding the side seam of a can body the invention has the advantage that the entire side seam of a can body can be welded in the time required for making a single spot weld thereby facilitating the construction of can bodies.

The above object is accomplished by making one, at least, of the two electrodes of the welding machine with a plurality of spaced contacts, each of which contacts cooperates with the other electrode to make a spot weld, said contacts being so spaced that the zone of fusion formed around each contact during the welding operation will overlap the zones of fusion formed around adjacent contacts thereby producing the continuous seam.

A further object of the invention is to provide an electric welding machine of this type which is constructed so that the electrode having the spaced contacts will present fresh contact surfaces to the material being welded at each operation thereby eliminating any danger that the contacts will become excessively heated and thus burned or injured by repeated welding operations.

One way of accomplishing this object is by making the electrode having the plurality of contacts circular in cross section with the axis thereof extending parallel to the seam to be welded and by providing means for turning the electrode on its axis after each operation.

Further objects of the invention are to improve generally electric welding machines in the particulars hereinafter set forth and then pointed out in the appended claims.

In the drawings wherein I have illustrated a selected embodiment thereof;

Fig. 3 is a fragmentary sectional view showing the means for operating and turning the electrode having the plurality of contacts;

Fig. 4 is a vertical section through the electrode having the plurality of contacts;

Fig. 5 is a fragmentary view showing the electrodes and a can body in position to be welded thereby;

Fig. 6 is a perspective view of a can body;

Fig. 7 is a diagrammatic view illustrating the operation of the device in making a continuous welded seam.

Figure 1:
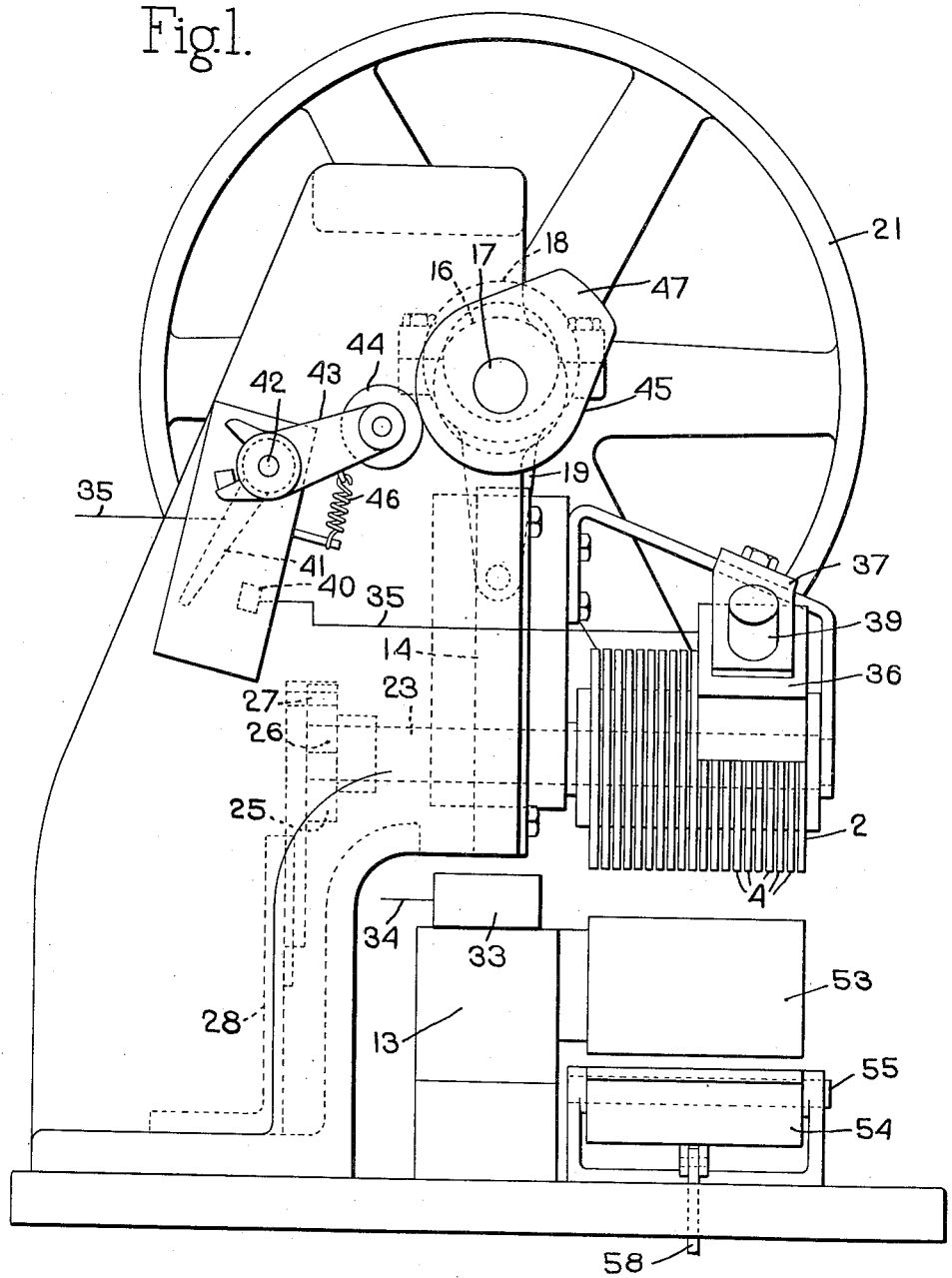
Fig. 1 is a side view of the welding machine embodying the invention.

The two electrodes of the welding machine are shown at 1 and 2 respectively, said electrodes being mounted on a suitable supporting frame 3. The electrode 1 is shown in the form of a bar adapted to engage the interior of the can body along the line of the edges to be welded together and the electrode 2 is formed with a plurality of spaced contacts 4, each of which cooperates with the electrode 1 to form a spot weld.

In making any spot weld the welding or fusing action takes place not only in the metal directly between the contacting faces of the electrodes, but also in a zone surrounding the contacting faces which, for convenience, is referred to as a "zone of fusion." The contacts 4 of the electrode 2 are so spaced along the line of the seam that the zone of fusion formed in connection with any spot weld will overlap the zones of fusion formed in connection with adjacent spot welds thereby producing the continuous welded seam. This is illustrated diagrammatically in Fig. 7 wherein 5 and 6 represent two sheets having their edges 7, 8 overlapping and which are to be welded together along the line of the overlap. In said figure, 9 indicate the areas where the contacts 4 engage the sheet 6, each area constituting the center of a spot weld, and 10 indicate the zones of fusion which constitute the outer portion of each spot weld.

Fig. 7 illustrates the areas 9 as spaced from each other but the zones of fusion as overlapping, and as the welding and fusion of the metal occurs throughout the zone of fusion there will be produced thereby a continuous welded seam.

The electrodes 1 and 2 are mounted so that they can be moved relatively toward and from each other, and in making a can body a sheet metal blank is formed into the cylindrical shape of the can body 11 with the edges 5, 6 overlapping, and said blank is placed over the electrode 1 with the overlapping edges in contact therewith and the electrodes 1 and 2 are then moved relatively into welding position to bring the contacts 4 against the outer face of the can body, the result of this operation producing a series of overlapping spot welds, as shown in Fig. 7, which form a continuous welded seam indicated at 12 in Fig. 6.

While the electrodes may be mounted in any appropriate way to permit them to be moved relatively into and out of welding position, I have herein shown the electrode 1 as stationarily supported on the portion 13 of the frame, and have shown means for moving the electrode 2 vertically toward and from the electrode 1. The electrode 2 is shown as carried by a supporting head 14 mounted to slide vertically in ways 15 with which the frame 3 is provided. Said head 14 is given its vertical reciprocation through the medium of an eccentric 16 formed on a driving shaft 17, said eccentric having an eccentric strap 18 provided with an arm 19 that is connected to the head 14. The shaft 17 may be rotated in any suitable way as by means of a driving pulley 21.

With this construction a continuous welded side seam 12 on a can body can be made at a single operation of the machine and in substantially the time required for making a single spot weld. This feature lends itself to high speed production since all the spot welds which constitute the continuous side seam are formed at one operation, and the side seams of successive cans can be welded as rapidly as the can bodies can be introduced into and removed from the machine.

In order to avoid the danger that the separate contacts 4 of the electrode 2 will become overheated by the making of successive welded seams in rapid succession, I propose to construct said electrode 2 so that each contact 4 will present a fresh surface for engagement with the metal to be welded at each operation. This can be done conveniently by making the electrode 2 cylindrical in cross section with its axis extending parallel to the seam to be welded and providing means for turning the electrode on its axis at each welding operation.

An electrode of this type is herein illustrated and it comprises a central body portion 22 formed with a plurality of radial peripheral ribs constituting the contacts 4. Each contact, therefore, has a disk-like structure. These contacts may be integral with the body 22 or may be separate members secured thereto in any suitable way. The electrode 2 is mounted on a shaft 23 which is rotatably carried by the head 14, said electrode being insulated from the shaft by suitable insulation 24.

Each contact 4 thus is provided with a cylindrical contact surface represented by the periphery of the disk-like structure, and whenever the electrode 2 is turned about the shaft 23 a fresh surface of each contact 4 will be brought into position for engaging the metal to be welded.

My invention contemplates various ways of turning the electrode 2 on its axis. One simple means is a pawl and ratchet device such as shown in Fig. 3 and constructed to give the electrode 2 a slight turning movement each time it is raised from welding position to open position.

The shaft 23 is shown as extending through the head 14 and on its rear end it carries a ratchet wheel 25 with which a spring-pressed pawl 26 has engagement. This pawl 26 is pivotally mounted at 27 on a suitable stand or support 28 and is acted on by a spring 29 which holds it in operative engagement with the ratchet wheel 25. During the downward movement of the head 14 the ratchet wheel 25 will click over the pawl and during the upward movement the engagement of the pawl with the ratchet teeth will turn the ratchet wheel and shaft 23 counterclockwise in Fig. 3.

By means of this construction the contacts 4 present a fresh surface to the metal to be welded at each operation which eliminates the possibility that the contact surface of any contact will become damaged by repeated welding operations performed in rapid succession. Moreover, since each contact is in the form of a radial peripheral rib or flange the electrode 2 presents a large amount of radiating surface through which the heat generated in the electrode by the welding operation is quickly dissipated. 30 indicate blades which are carried by a block 31 secured to the frame and which extend into the spaces or slots 32 between the contacts 4. These blades closely fit the spaces and they serve to scrape or clean from the electrode any burrs or rough edges that might be formed on the contact faces of the contacts 4 during the welding operation. The scraping or cleaning action is performed by the rotation of the electrode 2 relative to the blades. The welding current may be fed to the electrodes in any appropriate way. The lower electrode 1 is shown as being connected to a terminal member 33 to which one side 34 of the welding circuit is secured. The other side 35 of the welding circuit connects to a shoe or terminal member 36 which is carried by a suitable arm 37 and which engages the periphery of the electrode 2, thereby feeding the current thereto. This shoe 36 is shown as being pressed against the contact 2 by means of a spring 38 which is enclosed in a housing 39 and is secured to the arm 37.

The welding circuit is normally open, and I have provided herein means for automatically closing the circuit when the contact 2 moves down into contact with the metal to be welded and for opening said circuit as the electrode 2 rises. The side 35 of the welding circuit is provided with a switch comprising a fixed contact 40 and a movable contact 41. The movable contact 41 is carried by a rock shaft 42 which is suitably insulated from the frame and which has fast thereon an arm 43 provided with a roll or follower 44 that is engaged by a cam 45 fast on the shaft 17. The follower 44 is held in contact with the cam 45 by means of a suitable spring 46. When the roll 45 is on the low portion of the cam as shown in Fig. 1 the switch will be opened, and this is the condition when the electrode 2 is in its raised position.

When the high portion 47 of the cam engages the roll 44 the arm 43 is swung backwardly in Fig. 1, thereby bringing the switch arm 41 into engagement with the switch contact 40 and thus closing the welding circuit. The cam 45 is so designed that this closing of the circuit occurs when the electrode 2 has been moved downwardly into welding position, and the circuit is opened as soon as the electrode 2 starts its upward movement.

The connection between the eccentric arm 19 and the head 14 is preferably a yielding one. The arm 19 has a foot member 48 pivotally connected thereto at 49, said foot member being provided with a recess 50 to receive a compression spring 51 which is interposed between the foot member and the head 14. The foot members 48 is connected to the head 14 with the lost motion connection through the medium of bolts 52.

Normally the expansion of the spring 51 holds the parts in the position shown in Fig. 3. The parts are preferably so constructed that the electrode 2 will contact with the work just before the eccentric 16 reaches its low center. As soon as the electrode does thus contact with the work then during the time that the eccentric 16 is passing the low center the spring 51 will be compressed slightly thereby applying the desired pressure to the electrode 2 and maintaining it in contact with the work for a sufficient interval of time to perform properly the welding operation.

Figure 2:
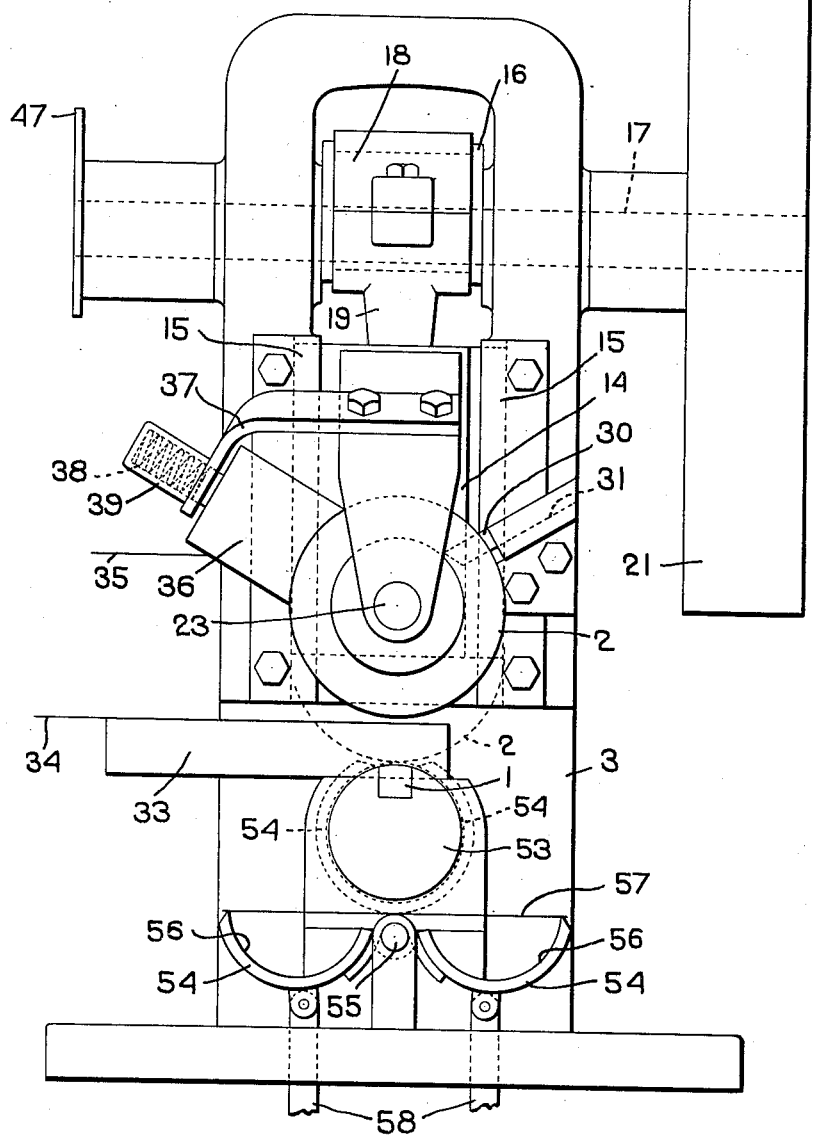
Fig. 2 is an end view looking toward the left in Fig. 1.

The machine herein shown is provided with means for forming the can body from the blank prior to the welding operation. For this purpose the electrode 1 has associated therewith a mandrel member 53, the diameter of which is the same as that of the can body 11 to be formed. This mandrel member 53 cooperates with two body-forming wings 54 which are pivoted coaxially at 55 and each of which has the concave face 56. These faces 56 are of a shape to fit the mandrel 53. In forming the can body a sheet metal blank 57 of the proper size is placed in position beneath the mandrel 53 and resting on the open wings 54 as shown in Fig. 2. These wings are then folded upwardly into the position shown in Fig. 5, during which operation the blank 57 is bent around the mandrel 53 into the shape of the can body 11 with the edges 5 and 6 overlapping. The wings 54 serve to hold the can body 11 in this position during the welding operation. As soon as the weld is completed the wings 54 are swung downwardly into their welded position. The welded can body may be removed from the mandrel and a new blank 57 placed in position ready to be operated on. The wings 54 may be actuated by any suitable means. Each wing is shown as having a link or actuating member 58 pivoted thereto by which it is moved from its open to its closed position, and the operation of these actuating members may be so timed that one wing 54 will operate slightly in advance of the other so as to secure the necessary overlapping of the edges of the blank without interference.

I claim:

1. A welding machine for making a row of separate spot welds to produce a continuous welded seam comprising two electrodes relatively movable toward and from each other and between which the work to be welded is placed, one of the electrodes having a plurality of contacts spaced from each other, each contact having an extended contact surface, and means to shift the position of the latter electrode periodically to bring fresh portions of the contact surfaces into engagement with the work.

2. A welding machine comprising two electrodes relatively movable toward and from each other, one of said electrodes having a plurality of disk-like contacts spaced from each other.

3. A welding machine of the class described comprising two electrodes relatively movable toward and from each other, one of said electrodes having a cylindrical form and being provided with a plurality of spaced radial peripheral ribs constituting separate contact portions whereby when the electrodes are brought into welding position a plurality of separate spot welds will be formed.

4. A welding machine of the class described comprising two electrodes relatively movable toward and from each other, one of said electrodes having a continuous contact surface to engage the work along the line of the seam to be welded and the other of said electrodes having a series of spaced contacts, each having an extended contact surface extending in a direction transverse to that of the first-named electrode, means to move the electrodes toward and from each other, and means to give periodically the second-named electrode a movement to bring fresh portions of the contact surfaces of the contacts into position to engage the work.

5. A welding machine comprising two electrodes relatively movable toward and from each other, one of said electrodes having a plurality of disk-like contacts spaced from each other, means to turn said electrode periodically to bring fresh portions of the disk-like contacts into position to engage the work, and means extending between said disk-like contacts and operable during the turning of said electrode for scraping the edges of portions of the disk-like contacts which have engaged the work.

HARRY SEBELL.